US012448940B2

(12) United States Patent
Ohori

(10) Patent No.: US 12,448,940 B2
(45) Date of Patent: Oct. 21, 2025

(54) VEHICLE

(71) Applicant: KAWASAKI MOTORS, LTD., Akashi (JP)

(72) Inventor: Ryosuke Ohori, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/351,450

(22) Filed: Jul. 12, 2023

(65) Prior Publication Data
US 2024/0167442 A1 May 23, 2024

(30) Foreign Application Priority Data
Nov. 18, 2022 (JP) .................. 2022-184982

(51) Int. Cl.
F02M 35/16 (2006.01)
F01M 13/00 (2006.01)
F02F 7/00 (2006.01)

(52) U.S. Cl.
CPC ...... F02M 35/162 (2013.01); F01M 13/0033 (2013.01); F02F 7/0021 (2013.01)

(58) Field of Classification Search
CPC ............. F02M 35/162; F02M 35/0204; F02M 35/10321; F02M 35/10078; F02F 7/0021; F02D 9/1005; F01M 13/0033
See application file for complete search history.

(56) References Cited

U.S. PATENT DOCUMENTS

| | | | |
|---|---|---|---|
| 5,967,127 A | 10/1999 | Okawada et al. | |
| 2001/0050193 A1 | 12/2001 | Yoshida et al. | |
| 2003/0226553 A1* | 12/2003 | Yasui | F02M 35/10196 |
| | | | 123/573 |
| 2005/0081837 A1 | 4/2005 | Nishi et al. | |
| 2020/0080498 A1* | 3/2020 | Mori | F02D 9/107 |
| 2021/0003105 A1* | 1/2021 | Nishiyabu | F02F 7/0039 |
| 2023/0151785 A1* | 5/2023 | Fukui | F02M 35/0201 |
| | | | 55/385.3 |

FOREIGN PATENT DOCUMENTS

| | | | |
|---|---|---|---|
| JP | 3102257 B2 | 10/2000 | |
| JP | 3965960 B2 * | 8/2007 | ............. F02B 75/22 |
| JP | 2019206955 A | 12/2019 | |

* cited by examiner

Primary Examiner — Syed O Hasan
(74) Attorney, Agent, or Firm — Alleman Hall & Tuttle LLP

(57) ABSTRACT

A vehicle includes: an internal combustion engine used for traveling and including a crank case and a cylinder block connected to the crank case; an air cleaner that purifies intake air to be supplied to the internal combustion engine; and a breather tube that is connected to the crank case and the air cleaner and supplies a gas in the crank case toward the air cleaner. A connection portion between the breather tube and the crank case is located at a first side of a vehicle width direction middle of the cylinder block in a vehicle width direction.

15 Claims, 4 Drawing Sheets

VEHICLE

CROSS-REFERENCE TO RELATED APPLICATION

This application claims priority to and the benefit of Japanese Patent Application No. 2022-184982 filed on Nov. 18, 2022, the entire disclosure of which is incorporated herein by reference.

BACKGROUND OF THE INVENTION

Field of the Invention

The present disclosure relates to a vehicle, particularly to the arrangement structure of a breather tube.

Description of the Related Art

Japanese Patent No. 3102257 discloses that to release internal pressure of a crank case located at an engine of a motorcycle, an air cleaner that purifies air to be introduced to the engine is made to communicate with an inside of the crank case by a breather tube.

When a worker accesses the breather tube of the motorcycle from an outside to perform maintenance of the engine or the like, there is a case where it is difficult to access the breather tube, and this deteriorates the ease of maintenance of the motorcycle. This problem may occur in the other vehicles in addition to the motorcycle.

SUMMARY OF THE INVENTION

A vehicle according to one aspect of the present disclosure includes: an internal combustion engine used for traveling and including a crank case and a cylinder block connected to the crank case; an air cleaner that purifies intake air to be supplied to the internal combustion engine; and a breather tube that is connected to the crank case and the air cleaner and supplies a gas in the crank case toward the air cleaner. A connection portion between the breather tube and the crank case is located at a first side of a vehicle width direction middle of the cylinder block in a vehicle width direction.

DESCRIPTION OF THE PREFERRED EMBODIMENTS

Figure 1:
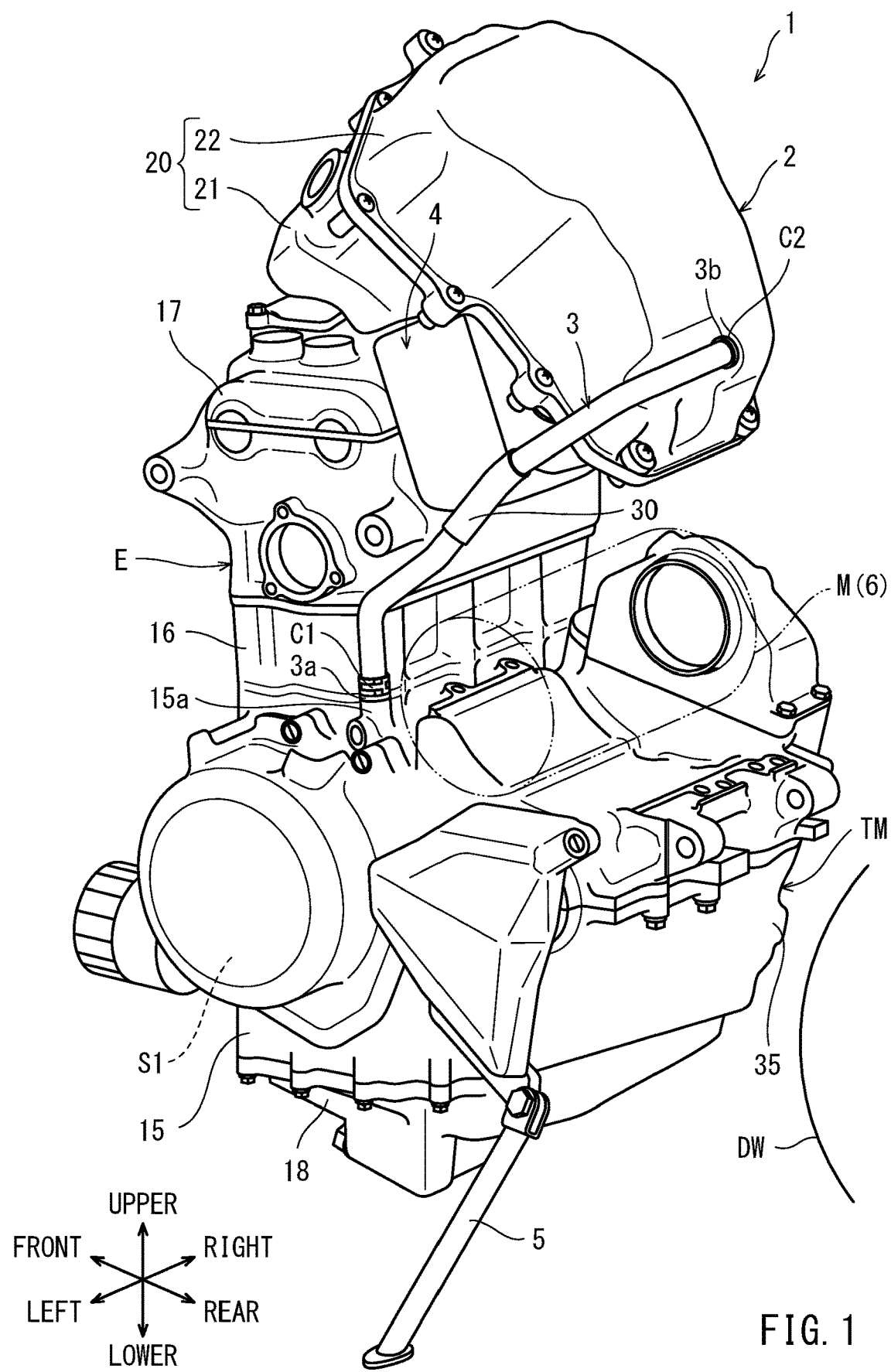
FIG. 1 is a diagram showing the appearance of major components of a vehicle according to an embodiment which are viewed from a diagonally backward left side.

Hereinafter, an embodiment of the present disclosure will be described with reference to the drawings. Directions stated in the following description correspond to directions from the viewpoint of an occupant of a vehicle 1. FIG. 1 is a diagram showing the appearance of major components of the vehicle 1 according to the embodiment which are viewed from a diagonally backward left side.

Figure 2:
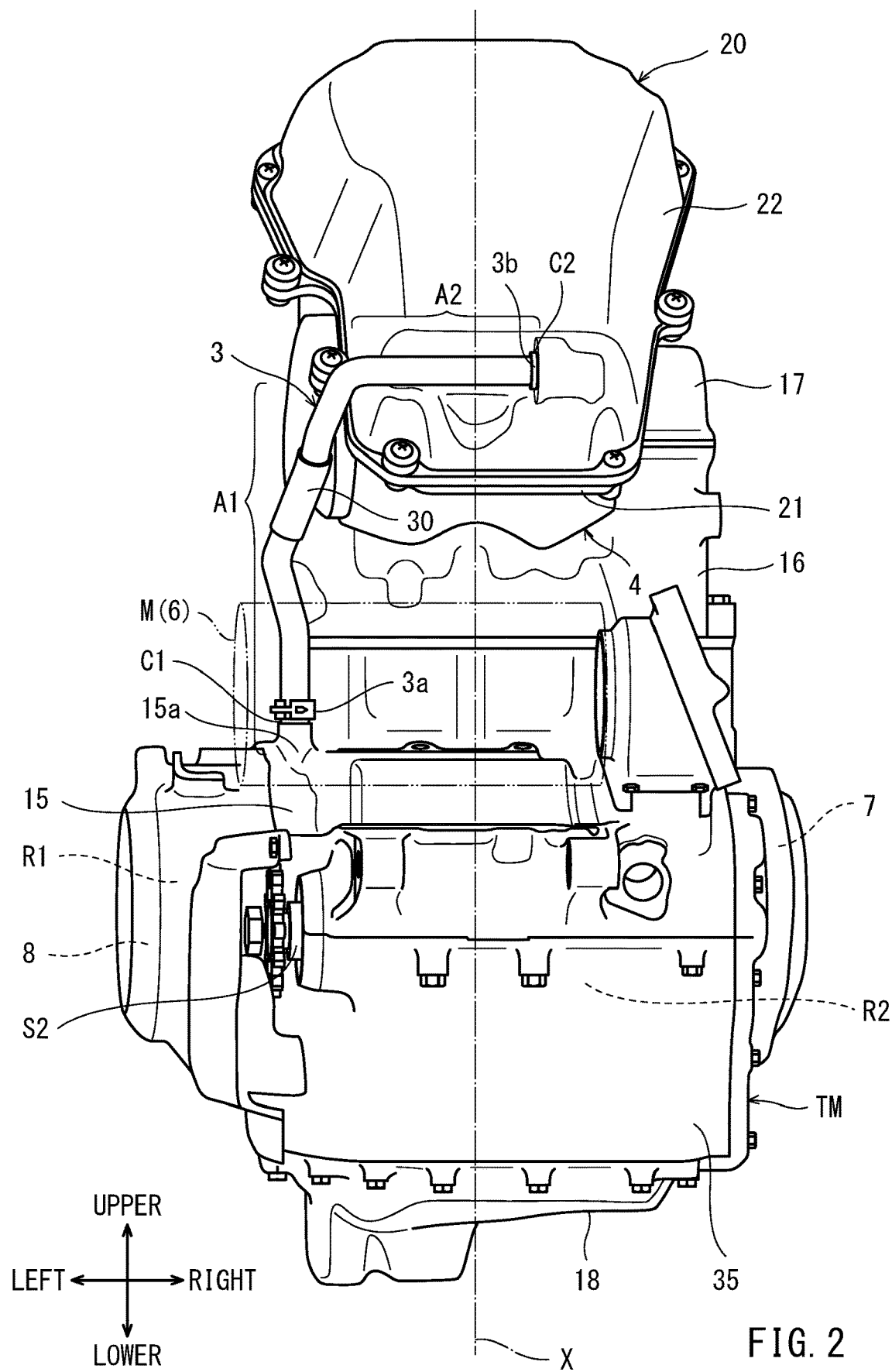
FIG. 2 is a diagram showing the appearance of major components of the vehicle of FIG. 1 which are viewed from a rear side.

As one example, the vehicle 1 shown in FIG. 1 is a hybrid vehicle including traveling driving sources. The traveling driving sources of the present embodiment include an internal combustion engine E and an electric motor M. In FIG. 1 and FIG. 2 described below, the contour of the electric motor M is schematically shown by broken lines. The vehicle 1 is switchable between a traveling mode in which only the electric motor M is used and a traveling mode in which at least the internal combustion engine E is used. Moreover, as another example, the vehicle 1 is a straddled vehicle that is straddled and ridden by an occupant, and is a motorcycle. However, the vehicle 1 is not limited to the motorcycle. Moreover, the vehicle 1 is not limited to the hybrid vehicle. The vehicle 1 may include only the internal combustion engine E as the traveling driving source.

The internal combustion engine E includes: a crank shaft 51; a crank case 15 in which the crank shaft 51 is rotatably supported; a cylinder block 16 located above the crank case 15; a cylinder head cover 17 located above the cylinder block 16; and an oil pan 18 located under the crank case 15. Moreover, the internal combustion engine E includes intake pipes 19 through which intake air having flowed through a below-described air cleaner 2 is supplied to an inside of the cylinder block 16 (see FIG. 3).

Moreover, the vehicle 1 includes the air cleaner 2, a breather tube 3, a throttle body 4, and a driving wheel DW. The air cleaner 2 purifies the intake air to be supplied to the internal combustion engine E. As one example, the air cleaner 2 is located at a position that overlaps an uppermost end of the internal combustion engine E when viewed from a front-rear direction. The air cleaner 2 includes an air cleaner box 20. The air cleaner box 20 includes a lower case 21 and an upper case 22 which are combined with each other. The breather tube 3 is connected to the crank case 15 and the air cleaner 2. The breather tube 3 supplies a gas in the crank case 15 toward the air cleaner 2. The gas flowing inside the breather tube 3 contains air and oil.

The breather tube 3 of the present embodiment includes: a first end 3a connected to the crank case 15; and a second end 3b connected to the air cleaner 2. As one example, the breather tube 3 is in a bent posture and connected to the crank case 15 and the air cleaner 2. Moreover, as one example, in a side view of the vehicle 1, the breather tube 3 is located so as to overlap the cylinder block 16 and the throttle body 4. Furthermore, as one example, part of the breather tube 3 is located so as to overlap an upper surface of the air cleaner 2. The throttle body 4 adjusts an intake air amount of the internal combustion engine E. The throttle body 4 of the present embodiment is located between the cylinder head cover 17 and the air cleaner 2. As one example, a protection tape 30 that protects the breather tube 3 from the throttle body 4 is located in a region of the breather tube 3 which overlaps the throttle body 4 in a vehicle width direction. Driving power of the internal combustion engine E is transmitted to the driving wheel DW. In the vehicle 1 of the present embodiment which is the motorcycle, the driving wheel DW is a rear wheel. The breather tube 3 is located in front of the driving wheel DW.

The vehicle 1 includes a transmission TM that changes the speed of the output of the traveling driving source. The transmission TM includes a transmission case 35 extending in the front-rear direction of a vehicle body of the vehicle 1. The transmission case 35 of the present embodiment is located behind the crank case 15. As one example, the transmission case 35 is formed integrally with the crank case 15. In a vertical direction, part of the breather tube 3 overlaps the transmission case 35. The electric motor M is located above the transmission case 35. The electric motor M is located behind the cylinder block 16 and above the transmission TM.

The vehicle 1 of the present embodiment includes a side stand 5 located at a first side of the vehicle 1 in the vehicle width direction. The side stand 5 is connected to the vehicle body of the vehicle 1. When the side stand 5 is in use, the side stand 5 contacts a road surface. The vehicle 1 is supported by the side stand 5 so as to slightly incline toward the first side in the vehicle width direction. In the present embodiment, as one example, the "first side in the vehicle width direction" denotes a left side of the vehicle 1 in the vehicle width direction, but may denote a right side of the vehicle 1 in the vehicle width direction.

FIG. 2 is a diagram showing the appearance of major components of the vehicle 1 of FIG. 1 which are viewed from the rear side. FIG. 2 shows a vertical line X that extends through a vehicle width direction middle of the cylinder block 16. As shown in FIG. 2, a connection portion C1 between the breather tube 3 and the crank case 15 in the vehicle 1 is located at the first side of the vehicle width direction middle of the cylinder block 16 in the vehicle width direction. Therefore, for example, at the time of the maintenance of the vehicle 1, a worker can easily access the breather tube 3 from an outside of the vehicle 1 in the vehicle width direction. Thus, the deterioration of the ease of maintenance of the vehicle 1 due to the difficulty of the access to the breather tube 3 at the time of the maintenance of the vehicle 1 is prevented. Herein, one example of the "maintenance" is work of detaching the air cleaner 2 from the internal combustion engine E for the purpose of, for example, replacing a spark plug of the internal combustion engine E.

In the vehicle 1, the side stand 5 and the connection portion C1 between the breather tube 3 and the crank case 15 are located at the same side of the vehicle body in the vehicle width direction. Moreover, as one example, the connection portion C1 is located in front of a rear end of the electric motor M. At the connection portion C1 of the present embodiment, the first end 3a of the breather tube 3 is inserted into a communication pipe 15a that is located at the crank case 15 and communicates with an inside of the crank case 15, and a band is wound around an outer periphery of the first end 3a. Thus, the first end 3a of the breather tube 3 is fixed to the communication pipe 15a. The configuration of the connection portion C1 is not limited to this.

The connection portion C1 between the breather tube 3 and the crank case 15 in the present embodiment is located at the first side of the cylinder block 16 in the vehicle width direction and outside the cylinder block 16. Therefore, in the vehicle 1, the connection portion C1 can be exposed to an outside at a position that is located at the first side of the cylinder block 16 in the vehicle width direction and outside the cylinder block 16. Moreover, the breather tube 3 of the present embodiment includes a first region A1 and a second region A2 described below. The first region A1 extends from the connection portion C1 toward the air cleaner 2 through a position that is located at the first side of the cylinder block 16 in the vehicle width direction and outside the cylinder block 16. The second region A2 extends from a connection portion C2 between the breather tube 3 and the air cleaner 2 toward the first side of the air cleaner 2 in the vehicle width direction.

The connection portions C1 and C2 of the present embodiment are located so as to be spaced apart from each other in an upper-lower direction of the vehicle 1. As one example, the connection portion C2 is located at a position that overlaps the cylinder head cover 17 when viewed in the front-rear direction of the vehicle 1. The connection portions C1 and C2 are respectively located at both sides of a vehicle width direction center of the electric motor M of the vehicle 1. Moreover, the connection portions C1 and C2 are respectively located at both sides of a vehicle width direction center of the air cleaner 2 of the vehicle 1. When viewed from the front-rear direction of the vehicle 1, the connection portions C1 and C2 are located at positions that do not overlap each other in the upper-lower direction of the vehicle 1. Moreover, as one example, the second region A2 is linear. The second region A2 of the present embodiment is parallel to the vehicle width direction of the vehicle 1. The term "parallel" used herein denotes not only a completely parallel state but also an inclined state where an angle between an axial direction of the second region A2 and the vehicle width direction of the vehicle 1 is a value within a range of 0° or more and 5° or less.

As one example, the vehicle 1 further includes an attachment 6 for the internal combustion engine E. The attachment 6 is located behind the cylinder block 16 and above the crank case 15. Examples of the attachment 6 include: the electric motor M for traveling; an electric shifter that switches the stages of a transmission that changes the speed of the output of the traveling driving source; a cooler; and a turbocharger. However, the attachment 6 is not limited to these. The second region A2 of the breather tube 3 is located above the attachment 6. Therefore, at the time of the maintenance of the vehicle 1, the worker can easily access the second region A2 of the breather tube 3 from an outside.

Moreover, as shown in FIG. 2, the vehicle 1 includes a clutch 7 that establishes or cuts a power transmitting path between the internal combustion engine E and the driving wheel DW. The clutch 7 is located at a position that deviates from the vehicle width direction middle of the cylinder block 16 toward a second side in the vehicle width direction. One example of the clutch 7 is a friction clutch. One example of the friction clutch is a hydraulic multiple disc clutch. The configuration of the clutch 7 is not limited to this.

Moreover, as one example, the crank case 15 includes a first chamber R1 and a second chamber R2. The first chamber R1 includes a storage space for oil. The second chamber R2 is separated from the first chamber R1 and located at a position that deviates from the vehicle width direction middle of the cylinder block 16 toward the first side in the vehicle width direction. The first chamber R1 communicates with the oil pan 18. The second chamber R2 is defined such that oil is prevented from entering into the second chamber R2 from the first chamber R1. Moreover, the vehicle 1 of the present embodiment includes a generator 8 that generates electric power by rotational driving power of the internal combustion engine E. The generator 8 is accommodated in the second chamber R2. One example of the generator 8 is an ISG (Integrated Starter Generator) that starts the internal combustion engine E.

When the ISG is located in the second chamber R2, the transfer of heat, generated in the first chamber R1, to the ISG can be suppressed as compared to when the ISG is located in the first chamber R1. Therefore, for example, even when the heat resistance of the ISG is limited, the vehicle 1 can easily include the ISG. Moreover, by making outside air flow into the second chamber R2 in which the ISG is located, the ISG can be easily cooled by, for example, air cooling. The second chamber R2 may accommodate a component other than the generator 8. The transmission TM includes an output shaft S2. The output shaft S2 is located at the first side of the transmission TM in the vehicle width direction and exposed to an outside of the transmission case 35. The rotational driving power of the output shaft S2 is transmitted to the driving wheel DW.

Figure 3:
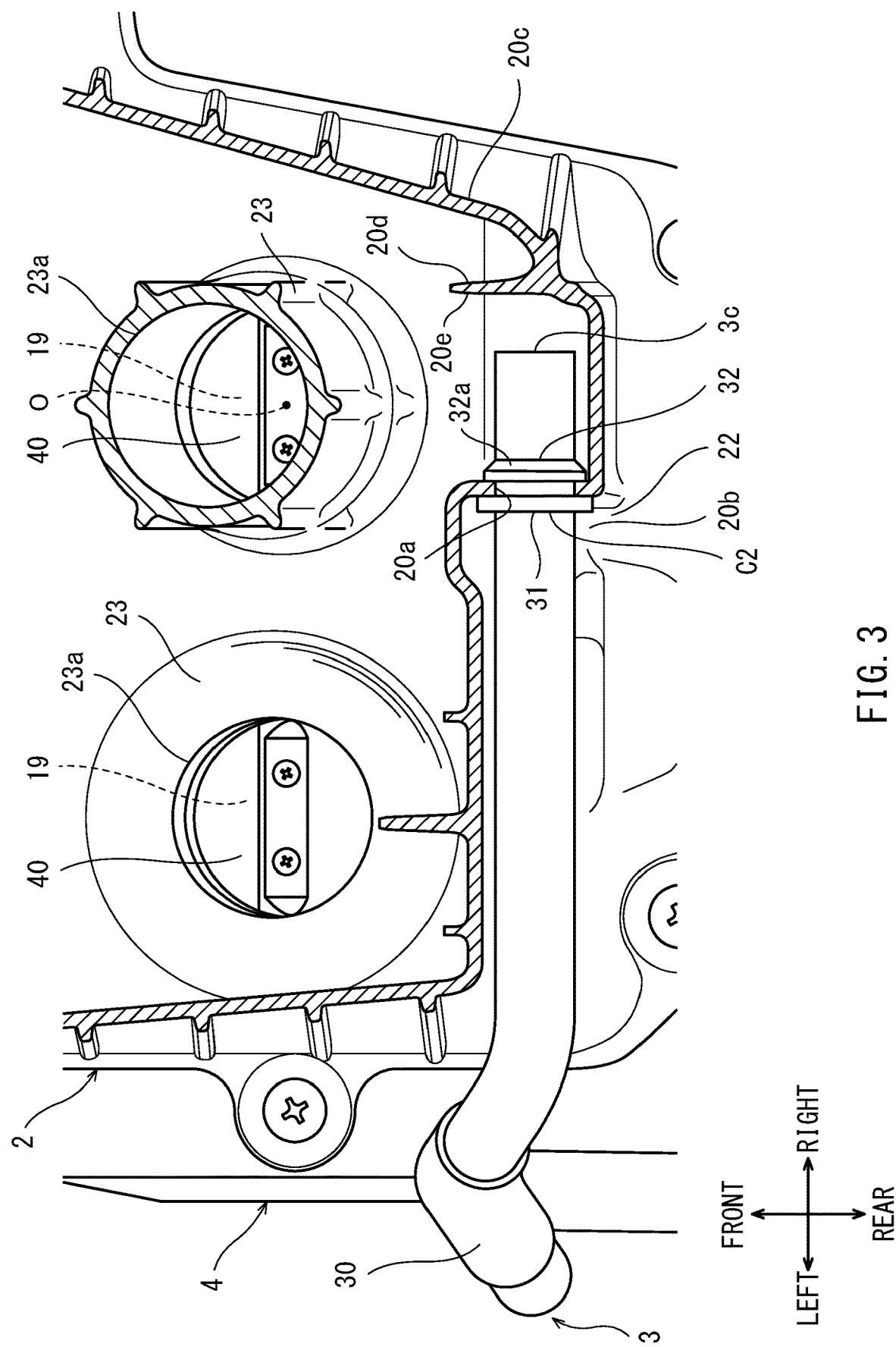
FIG. 3 is a diagram showing some of components of a breather tube of FIG. 1 which are located at an air cleaner side, and some of components of the air cleaner.

FIG. 3 is a diagram showing some of components of the breather tube 3 of FIG. 1 which are located at the air cleaner 2 side, and some of components of the air cleaner 2. FIG. 3 shows a section of the air cleaner box 20. As shown in FIG. 3, the connection portion C2 of the breather tube 3 includes a pair of ribs 31 and 32 which extend entirely in a circumferential direction of the breather tube 3 and are lined up in a longitudinal direction of the breather tube 3. The rib 32 located closer to an opening 3c than the rib 31 has a smaller outer diameter than the rib 31. A main surface 32a of the rib 32 which is located at the opening 3c side has a tapered shape that tapers toward the opening 3c. The air cleaner 2 includes an internal space that communicates with the intake pipes 19 of the internal combustion engine E and is defined by the air cleaner box 20. The air cleaner box 20 includes a through hole 20a that communicates with an outside.

As one example, the connection portion C2 of the breather tube 3 connects the breather tube 3 and the air cleaner 2 in such a manner that: the main surface 32a is brought into contact with an opening peripheral edge of the through hole 20a of the air cleaner box 20; the rib 32 is press-fitted to the through hole 20a; and the pair of ribs 31 and 32 sandwich a peripheral edge portion of the through hole 20a of the air cleaner box 20. Since the breather tube 3 includes the pair of ribs 31 and 32, for example, labor of clamping the connection portion C2 from an outside can be omitted. The configuration of the connection portion C2 is not limited to this. Moreover, the connection portion C2 may be located at, for example, a position that overlaps the vehicle width direction middle of the cylinder block 16.

The air cleaner box 20 includes a depressed portion 20b that extends in the vehicle width direction and is depressed toward an inside of the air cleaner box 20. As one example, the depressed portion 20b is located at the upper case 22. As shown in FIG. 3, at least part of the second region A2 of the breather tube 3 is located in an internal space of the depressed portion 20b. Therefore, the breather tube 3 and the air cleaner box 20 are prevented from interfering with each other. Moreover, a projecting amount of the second region A2 projecting upward from an upper surface of the upper case 22 is made small.

The throttle body 4 of the present embodiment includes throttle valves 40 located so as to overlap the intake pipes 19. The intake pipes 19 of the internal combustion engine E are opened or closed by the throttle valves 40. The intake pipes 19 are located so as to be lined up in the vehicle width direction of the cylinder block 16. Moreover, the air cleaner 2 of the present embodiment includes supply pipes 23 which are located so as to be lined up in the vehicle width direction of the cylinder block 16 and supply the intake air to the cylinder block 16. The supply pipes 23 are located so as to individually correspond to the intake pipes 19. The intake air having flowed through the supply pipes 23 flows in the intake pipes 19 through the throttle valves 40 and is supplied to the inside of the cylinder block 16.

The opening 3c of the breather tube 3 is directed in a different direction from an opening 23a of the supply pipe 23 that is located at an end position at the second side of the cylinder block 16 in the vehicle width direction among the supply pipes 23. In addition, the opening 3c of the breather tube 3 is directed to the second side in the vehicle width direction at a position that deviates from a center O of the opening 23a of the above supply pipe 23 toward the second side in the vehicle width direction. The opening 3c of the breather tube 3 and the opening 23a of the supply pipe 23 are directed in different directions from each other. The term "different directions" used herein do not denote a pair of directions facing each other on the same axis. Therefore, the flow of the oil, having flowed through the breather tube 3, into the cylinder block 16 through the supply pipe 23 and the intake pipe 19 is suppressed.

Moreover, as one example, the air cleaner 2 includes a wall surface 20e that is located so as to be opposed to the opening 3c of the breather tube 3. Moreover, the air cleaner box 20 includes: an outer wall 20c that defines an internal space of the air cleaner 2; and a plate-shaped rib 20d projecting from the outer wall 20c toward the internal space. The rib 20d includes the wall surface 20e. When viewed from the second side in the vehicle width direction, the wall surface 20e of the present embodiment is located at a position that overlaps the opening 3c of the breather tube 3. Since the air cleaner 2 includes the wall surface 20e, a gas containing oil mist having flowed through the breather tube 3 collides with the wall surface 20e, and this promotes gas-liquid separation of the gas.

Figure 4:
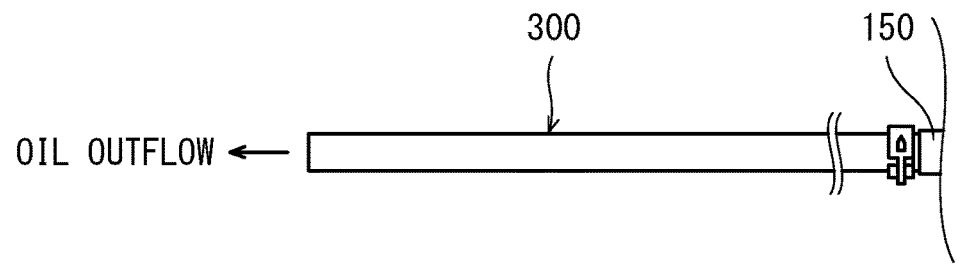
FIG. 4 is a diagram showing the state of a breather tube when a conventional vehicle has fallen down.
Figure 5:
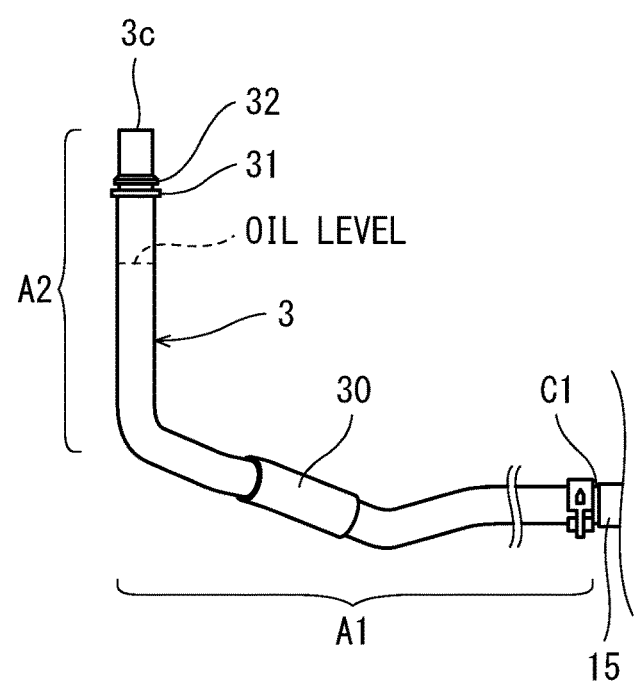
FIG. 5 is a diagram showing the state of the breather tube when the vehicle of FIG. 1 has fallen down.

FIG. 4 is a diagram showing the state of a breather tube 300 when a conventional vehicle has fallen down. Moreover, FIG. 5 is a diagram showing the state of the breather tube 3 when the vehicle 1 of FIG. 1 has fallen down. As shown in FIG. 4, when the conventional vehicle largely inclines to the first side of the vehicle in the vehicle width direction due to fall-down or the like, the breather tube 300 becomes a state of extending in the horizontal direction. The oil in a crank case 150 flows through a connection portion between the crank case 150 and the breather tube 300 into the breather tube 300 in the above state. Therefore, the oil in the breather tube 300 may flow to an outside and flow into the air cleaner.

On the other hand, as shown in FIG. 5, in the vehicle 1 of the present embodiment, the connection portion C1 is located at the first side of the vehicle width direction middle of the cylinder block 16 in the vehicle width direction and is located at a position that deviates from the vehicle width direction middle of the cylinder block 16 toward the first side in the vehicle width direction. Moreover, the opening 3c of the breather tube 3 which is located at the air cleaner 2 side is located at a position that deviates from the vehicle width direction middle of the cylinder block 16 toward the second side in the vehicle width direction.

Therefore, even when the vehicle 1 largely inclines toward the first side of the vehicle in the vehicle width direction due to fall-down or the like, and the oil flows from the crank case 15 into the breather tube 3, the oil in the breather tube 3 does not flow to an outside until the height position of an oil level in the breather tube 3 exceeds the height position of the opening 3c of the breather tube 3 which is located at the air cleaner 2 side. Thus, the oil in the crank case 15 is prevented from flowing into the air cleaner 2 through the breather tube 3.

Moreover, as shown in FIG. 5, the breather tube 3 of the present embodiment includes: the first region A1 extending from the connection portion C1 toward the air cleaner 2 through a position that is located at the first side of the cylinder block 16 in the vehicle width direction and outside the cylinder block 16; and the second region A2 extending from the connection portion C2 toward the first side of the air cleaner 2 in the vehicle width direction. Therefore, even if the oil in the crank case 15 flows out into the breather tube 3, the oil in the breather tube 3 does not flow to an outside until both the first region A1 and the second region A2 are completely filled with the oil in the breather tube 3. Thus, at least until both the first region A1 and the second region A2 are completely filled with the oil in the breather tube 3, the oil having flowed out from the crank case 15 into the breather tube 3 can be made to stay in the breather tube 3. Therefore, for example, without a complex-structure gas-liquid separation chamber located in the air cleaner 2, the oil can be prevented from flowing from the breather tube 3 into the air cleaner 2.

In the present embodiment, as one example, the second region A2 is located parallel to the vehicle width direction of the vehicle 1. Therefore, when the vehicle 1 falls down to the first side in the vehicle width direction, the second region A2 extends in the vertical direction. Thus, the oil in the breather tube 3 can be further prevented from flowing into the air cleaner 2. For example, in a case where the height position of the opening 3c of the breather tube 3 when the vehicle 1 has fallen down to the first side in the vehicle width direction is set to be higher than the oil level of the oil in the crank case 15 when the vehicle 1 has fallen down to the first side in the vehicle width direction, the oil in the breather tube 3 can be further prevented from flowing into the air cleaner 2. In FIG. 5, the oil level in the breather tube 3 is shown by a broken line. However, the position of the oil level is not limited to this.

As above, the above embodiment has been described as an example of the technology disclosed in the present application. However, the technology of the present disclosure is not limited to this and is also applicable to embodiments in which modifications, replacements, additions, omissions, and the like are suitably made. Moreover, a new embodiment may be prepared by combining the components described in the above embodiment. For example, some of components in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

Disclosed Aspects

The following aspects disclose preferred embodiments.

First Aspect

A vehicle including:
an internal combustion engine used for traveling and including
  a crank case and
  a cylinder block connected to the crank case;
an air cleaner that purifies intake air to be supplied to the internal combustion engine; and
a breather tube that is connected to the crank case and the air cleaner and supplies a gas in the crank case toward the air cleaner, wherein
  a connection portion between the breather tube and the crank case is located at a first side of a vehicle width direction middle of the cylinder block in a vehicle width direction.

According to the above configuration, the connection portion between the breather tube and the crank case is located at the first side of the cylinder block in the vehicle width direction and outside the cylinder block. Therefore, for example, at the time of the maintenance of the vehicle, a worker can easily access the breather tube from an outside of the vehicle in the vehicle width direction. Thus, the deterioration of the ease of maintenance of the vehicle due to the difficulty of the access to the breather tube can be prevented. Therefore, for example, at the time of the maintenance, when performing work of detaching the air cleaner from the internal combustion engine for the purpose of replacing the spark plug of the internal combustion engine, the worker can easily access the breather tube from an outside and perform the work by detaching the breather tube from the air cleaner or the internal combustion engine.

Second Aspect

The vehicle according to the first aspect, wherein the connection portion between the breather tube and the crank case is located at the first side of the cylinder block in the vehicle width direction and outside the cylinder block.

According to the above configuration, the connection portion can be exposed to an outside at a position that is located at the first side of the cylinder block in the vehicle width direction and outside the cylinder block. Therefore, in order that the worker accesses the connection portion between the breather tube and the crank case at the time of the maintenance, the worker does not have to put his/her hand into an inside in the vehicle width direction beyond the cylinder block of the vehicle. Thus, the attachability and detachability of the breather tube with respect to the cylinder block and the air cleaner can be further easily improved.

Third Aspect

The vehicle according to the first or second aspect, wherein:
  the connection portion between the breather tube and the crank case is located at a position that deviates from the vehicle width direction middle of the cylinder block toward the first side in the vehicle width direction; and
  an opening of the breather tube which is located at the air cleaner side is located at a position that deviates from the vehicle width direction middle of the cylinder block toward a second side in the vehicle width direction.

According to the above configuration, in the vicinity of the connection portion between the breather tube and the air cleaner, for example, the breather tube can include a region that extends from the first side of the cylinder block toward the second side of the cylinder block in the vehicle width direction. Therefore, even if the vehicle falls down to the first side in the vehicle width direction, and the oil in the crank case flows out into the breather tube, the oil in the breather tube is made to stay in the above region, and therefore, the flow of the oil from the breather tube into the air cleaner can be suppressed.

Fourth Aspect

The vehicle according to any one of the first to third aspects, wherein the breather tube includes:

a first region extending from the connection portion between the breather tube and the crank case toward the air cleaner through a position that is located at the first side of the cylinder block in the vehicle width direction and outside the cylinder block; and a second region extending from a connection portion between the breather tube and the air cleaner toward the first side of the air cleaner in the vehicle width direction.

According to the above configuration, the breather tube includes the first region and the second region. Therefore, even if the vehicle falls down to the first side in the vehicle width direction, and the oil in the crank case flows out into the breather tube, the oil can be made to stay in the breather tube at least until both the first region and the second region are filled with the oil. Thus, the flow of the oil from the breather tube into the air cleaner can be suppressed.

Fifth Aspect

The vehicle according to the fourth aspect, further including an attachment for the internal combustion engine, the attachment being located behind the cylinder block and above the crank case, wherein the second region of the breather tube is located above the attachment.

According to the above configuration, since the second region of the breather tube is located above the attachment, the worker can easily access the second region of the breather tube from an outside at the time of the maintenance of the vehicle. Moreover, the second region of the breather tube and the attachment can be prevented from interfering with each other.

Sixth Aspect

The vehicle according to any one of the first to fifth aspects, wherein:
the crank case includes
a first chamber including a storage space for oil and
a second chamber that is separated from the first chamber and located at a position that deviates from the vehicle width direction middle of the cylinder block toward the first side in the vehicle width direction; and
the breather tube communicates with the first chamber through the connection portion between the breather tube and the crank case.

Since the crank case includes the first chamber and the second chamber, the height position of the oil level in the crank case rises more easily than when the crank case does not include the first chamber. However, according to the above configuration, even when the vehicle falls down to the first side in the vehicle width direction, and the oil in the first chamber flows out to the breather tube, the flow of the oil from the breather tube into the air cleaner can be suppressed.

Seventh Aspect

The vehicle according to any one of the first to sixth aspects, wherein:
the air cleaner includes supply pipes that are located so as to be lined up in the vehicle width direction of the cylinder block and supply intake air to the cylinder block;
an opening of the breather tube which is located at the air cleaner side is directed in a different direction from an opening of a supply pipe that is located at an end position at a second side of the cylinder block in the vehicle width direction among the supply pipes; and
the opening of the breather tube is directed to the second side in the vehicle width direction at a position that deviates from a center of the opening of the supply pipe toward the second side in the vehicle width direction.

According to the above configuration, even when the oil having flowed through the breather tube flows into the air cleaner, the amount of oil flowing into the cylinder block through the supply pipes can be reduced.

Eighth Aspect

The vehicle according to any one of the first to seventh aspects, wherein the air cleaner includes a wall surface located so as to be opposed to an opening of the breather tube which is located at the air cleaner side.

According to the above configuration, even when the mist containing the oil and the gas is injected from the breather tube into the air cleaner, the mist is sprayed to the wall surface of the air cleaner, and this can easily promote the gas-liquid separation of the mist. Therefore, the oil contained in the mist can be prevented from flowing through an intake passage of the air cleaner which extends toward the internal combustion engine. Moreover, since the air cleaner includes the wall surface, a dedicated complex structure that promotes the gas-liquid separation of the mist does not have to be included inside the air cleaner.

Ninth Aspect

The vehicle according to any one of the first to eighth aspects, further including a side stand located at the first side of the vehicle in the vehicle width direction.

According to the above configuration, the side stand and the connection portion between the breather tube and the crank case are located at the same side of the vehicle body in the vehicle width direction. Therefore, even when the vehicle falls down toward the side stand side, the oil having flowed through the breather tube can be prevented from flowing into the air cleaner.

Tenth Aspect

The vehicle according to any one of the first to ninth aspects, further including:
a driving wheel to which driving power of the internal combustion engine is transmitted; and
a clutch that establishes or cuts a power transmitting path between the internal combustion engine and the driving wheel, wherein
the clutch is located at a position that deviates from the vehicle width direction middle of the cylinder block toward a second side in the vehicle width direction.

According to the above configuration, the breather tube is prevented from interfering with the clutch, and the connection portion between the breather tube and the crank case can be easily located at a position that deviates from the vehicle width direction middle of the cylinder block toward the first side in the vehicle width direction.

Eleventh Aspect

The vehicle according to any one of the first to tenth aspects, wherein part of the breather tube is located so as to overlap an upper surface of the air cleaner.

According to the above configuration, the worker can easily access the breather tube from an outside, i.e., from above the air cleaner. Therefore, the attachability and detachability of the breather tube with respect to the air cleaner and the cylinder block can be further improved.

Twelfth Aspect

The vehicle according to any one of the first to eleventh aspects, wherein the vehicle is a motorcycle.

According to the motorcycle, the vehicle body inclines more easily than the other vehicles, and the oil having flowed through the breather tube easily flows into the air cleaner. Moreover, according to the motorcycle, the internal space of the vehicle body is limited, and the improvement of the ease of maintenance and the prevention of interference between parts are especially required. Therefore, according to the above configuration, when the vehicle is the motorcycle, the ease of maintenance of the vehicle can be especially improved.

What is claimed is:

1. A vehicle comprising:
    an internal combustion engine used for traveling and including:
        a crank case; and
        a cylinder block connected to the crank case;
    an air cleaner that purifies intake air to be supplied to the internal combustion engine;
    a breather tube that is connected to the crank case and the air cleaner and supplies a gas in the crank case toward the air cleaner; and
    a side stand located at a first side of the vehicle in a vehicle width direction,
    wherein:
        a connection portion between the breather tube and the crank case is located at the first side of a vehicle width direction middle of the cylinder block in the vehicle width direction;
        and is located at the first side of an end surface of the cylinder block in the vehicle width direction and outside the end surface of the cylinder block, the end surface being located at the first side in the vehicle width direction; and
        an opening of the breather tube which is located at the air cleaner side is located at a position that deviates from the vehicle width direction middle of the cylinder block toward a second side in the vehicle width direction.

2. The vehicle according to claim 1, wherein the breather tube includes a region extending from the connection portion between the breather tube and the crank case toward the air cleaner through a position that is located at the first side of the end surface of the cylinder block in the vehicle width direction and outside the end surface of the cylinder block.

3. The vehicle according to claim 1, wherein the breather tube includes:
    a first region extending from the connection portion between the breather tube and the crank case toward the air cleaner through a position that is located at the first side of the end surface of the cylinder block in the vehicle width direction and outside the end surface of the cylinder block; and
    a second region extending from a connection portion between the breather tube and the air cleaner toward the first side of the air cleaner in the vehicle width direction.

4. The vehicle according to claim 3, further comprising an attachment for the internal combustion engine, the attachment being located behind the cylinder block and above the crank case, wherein
    the second region of the breather tube is located above the attachment.

5. The vehicle according to claim 1, wherein:
    the crank case includes:
        a first chamber including a storage space for oil; and
        a second chamber that is separated from the first chamber and located at a position that deviates from the vehicle width direction middle of the cylinder block toward the first side in the vehicle width direction; and
    the breather tube communicates with the first chamber through the connection portion between the breather tube and the crank case.

6. The vehicle according to claim 1, wherein:
    the air cleaner includes supply pipes that are located so as to be lined up in the vehicle width direction of the cylinder block and supply intake air to the cylinder block;
    the opening of the breather tube which is located at the air cleaner side is directed in a different direction from an opening of a supply pipe that is located at an end position at the second side of the cylinder block in the vehicle width direction among the supply pipes; and
    the opening of the breather tube is directed to the second side in the vehicle width direction at a position that deviates from a center of the opening of the supply pipe toward the second side in the vehicle width direction.

7. The vehicle according to claim 1, wherein the air cleaner includes a wall surface located so as to be opposed to the opening of the breather tube which is located at the air cleaner side.

8. The vehicle according to claim 1, further comprising:
    a driving wheel to which driving power of the internal combustion engine is transmitted; and
    a clutch that establishes or cuts a power transmitting path between the internal combustion engine and the driving wheel, wherein
    the clutch is located at the position that deviates from the vehicle width direction middle of the cylinder block toward the second side in the vehicle width direction.

9. The vehicle according to claim 1, wherein part of the breather tube is located so as to overlap an upper surface of the air cleaner.

10. The vehicle according to claim 1, wherein the vehicle is a motorcycle.

11. The vehicle according to claim 1, wherein the air cleaner is located above the internal combustion engine so as to overlap the internal combustion engine in an upper-lower direction.

12. The vehicle according to claim 1, wherein an internal space of the opening of the breather tube which is located at the air cleaner side directly communicates with an internal space of the air cleaner.

13. A vehicle comprising:
    an internal combustion engine used for traveling and including:
        a crank case; and
        a cylinder block connected to the crank case;
    an air cleaner that purifies intake air to be supplied to the internal combustion engine;
    a breather tube that is connected to the crank case and the air cleaner and supplies a gas in the crank case toward the air cleaner; and a side stand located at a left side of the vehicle in a vehicle width direction, wherein:
- a connection portion between the breather tube and the crank case is located at a position that deviates from a left surface of the cylinder block toward the left side; and
- an opening of the breather tube which is located at the air cleaner side is located at a position that deviates from a left-right direction middle of the cylinder block toward a right side.

14. A vehicle comprising:
- an internal combustion engine used for traveling and including:
  - a crank case; and
  - a cylinder block connected to the crank case;
- an air cleaner that purifies intake air to be supplied to the internal combustion engine;
- a breather tube that is connected to the crank case and the air cleaner and supplies a gas in the crank case toward the air cleaner; and
- a side stand located at a first side of the vehicle in a vehicle width direction, wherein:
- a connection portion between the breather tube and the crank case is located at a position that deviates from a vehicle width direction middle of the cylinder block toward the first side in the vehicle width direction;
- an opening of the breather tube which is located at the air cleaner side is located at a position that deviates from the vehicle width direction middle of the cylinder block toward a second side in the vehicle width direction; and
- the breather tube includes a region extending from the connection portion between the breather tube and the crank case toward the air cleaner through a position that is located at the first side of an end surface of the cylinder block in the vehicle width direction and outside the end surface of the cylinder block, the end surface being located at the first side in the vehicle width direction.

15. The vehicle according to claim 1, wherein a connection portion between the breather tube and the air cleaner is located on an upper surface of the air cleaner.

* * * * *